Aug. 15, 1950     J. F. BAULSKI     2,518,517
BELL ALARM TIP-UP
Filed May 10, 1947
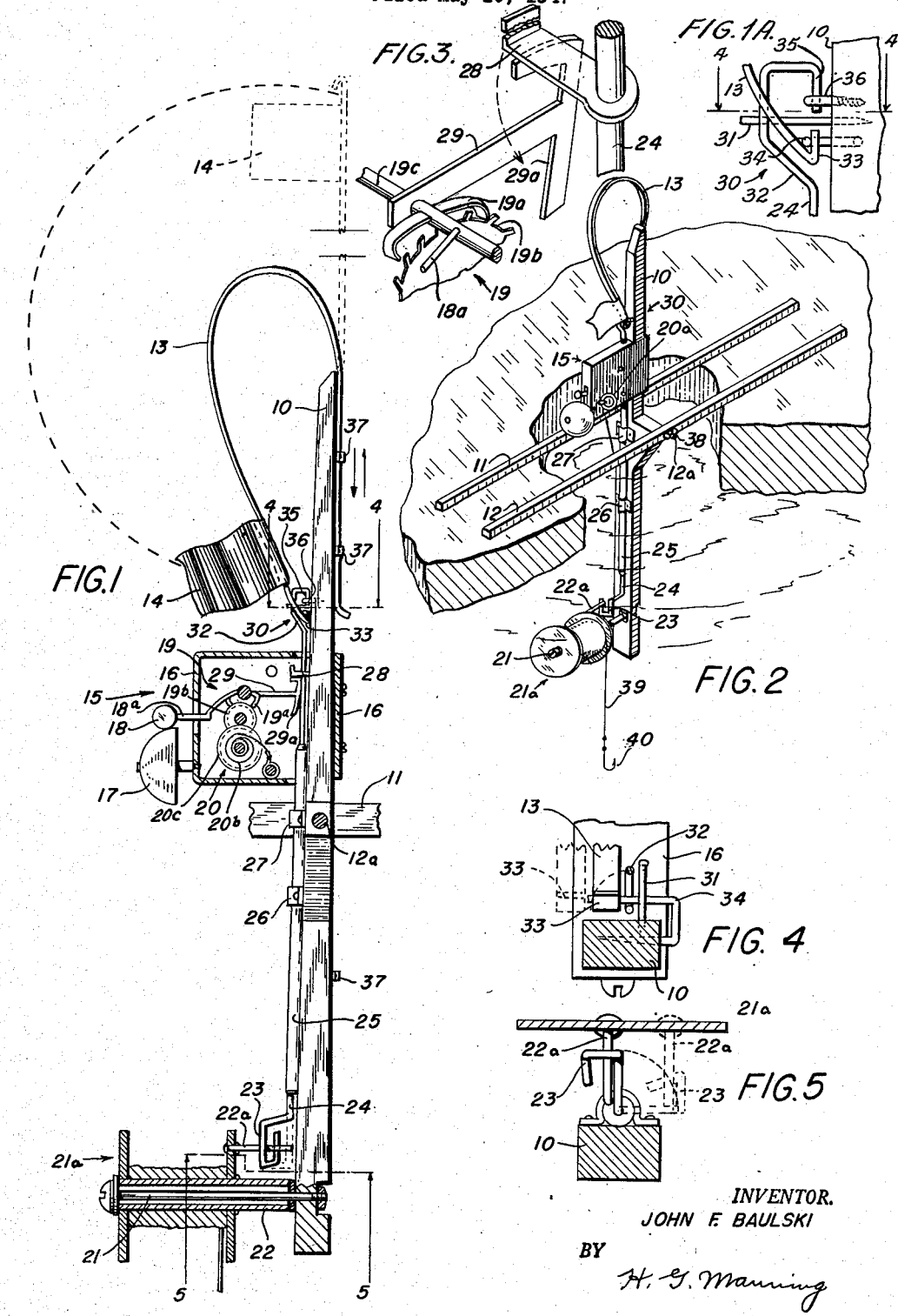
INVENTOR.
JOHN F. BAULSKI
BY
H. G. Manning
ATTY.

Patented Aug. 15, 1950

2,518,517

UNITED STATES PATENT OFFICE 2,518,517

BELL ALARM TIP-UP

John F. Baulski, Meriden, Conn.

Application May 10, 1947, Serial No. 747,197

4 Claims. (Cl. 43—16)

This invention relates to fishing apparatus and more particularly to a sensitive tip-up having a bell and a flag to give audible and visible signals when the hook is taken by a fish.

One object of the invention is to provide a device of the above nature in which the fish line cannot freeze during use.

A further object of the invention is to provide a device of the above nature which will be simple in construction, inexpensive to manufacture, easy to install and operate, compact, ornamental in appearance, and very efficient and durable in use.

With these and other objects in view, there has been illustrated in the accompanying drawing one form in which the invention may conveniently be embodied in practice.

In the drawing,

Fig. 1 is a fragmentary side elevation, partly in section, showing the bell alarm tip-up.

Fig. 1A is a fragmentary side elevation showing the flag release mechanism on a larger scale.

Fig. 2 is a perspective view of the tip-up as it appears when inserted through a hole in a body of ice, ready for use.

Fig. 3 is a perspective view, on an enlarged scale, showing details of the bell release mechanism.

Fig. 4 is a sectional view, on an enlarged scale, taken on the line 4—4 of Figs. 1 and 1A, showing details of the flag release mechanism.

Fig. 5 is a sectional view, on an enlarged scale, taken on the broken line 5—5 of Fig. 1, showing details of the bottom signal tripping mechanism.

Referring now to the drawings in which like reference numerals denote corresponding parts throughout the several views, the numeral 10 indicates a central beam adapted to be supported in an upright position in a hole in a body of ice by a pair of parallel supports 11, 12 embracing said beam 10 and swingably connected thereto by a central pivot bolt 12a—said supports resting upon the surface of the ice, as shown in Fig. 2.

The upper end of the beam 10 carries an adjustable flat spring 13 normally extending erect beyond the upper end of the beam 10, as shown in dotted lines in Fig. 1, and having a red signal flag 14, at the end thereof.

A bell alarm device 15 is mounted upon the beam 10 above the pivot bolt 12a, and comprises a housing 16 carrying an alarm bell 17 exteriorly thereof, and a clapper 18 adapted to be vibrated against the bell 17 by an escapement 19 having an anchor 19a which is engaged with an escape wheel 19b so as to be oscillated thereby. The anchor 19a is attached to a horizontal shaft 19c upon which the clapper 18 is mounted by a stem 18a.

Thus, rotation of the escape wheel 19b will cause the clapper 18 to vibrate and strike the bell 17 repeatedly.

In order to drive the escape wheel 19b, provision is made of a spring-driven mechanism 20 which comprises a coil spring 20b and gearing 20c for transmitting the force of said spring to said escape wheel 19b. A ring handle 20a is provided exteriorly of the housing 16 for winding the spring mechanism.

The lower end of the beam 10 is provided with a horizontal shaft 21 for rotatively mounting a fish line reel 21a. The reel 21a has a hub extension 22 which serves to space the reel 21a sufficiently from the beam 10 to provide ample clearance for movement of a crank-actuating pin 22a eccentrically mounted on the reel 21a parallel to the bolt 21.

The pin 22a engages in the lower U-shaped crank portion 23 of a shaft 24, extending upwardly lengthwise of the beam 10 and rotatably mounted in a "vaseline" filled tubular bearing member 25 fixed upon the beam 10 by securing straps 26, 27.

An intermediate portion of the shaft 24 passes through the housing 16 and is provided within said housing with an integral alarm catch lever 28 which is adapted to engage the end of a stop lever 29 secured to the oscillatable shaft 19c, so as to hold the alarm device 15 inactive. A small weight 29a is connected to the lever 29 to counterbalance the clapper 18.

A flag release mechanism 30 is provided at the upper end of the shaft 24, and comprises a horizontal crank stop pin 31 mounted in the beam 10, and a crank 32 integral with the shaft 24.

As a means for holding the flat spring 13 and the flag 14 thereon in depressed position (Figs. 1 and 2), the outer end of the spring 13 is formed into a hook 33 which is adapted to be engaged with one end of a horizontal U-shaped holding pin 34 driven into the beam 10.

The crank 32 at the upper end of the shaft 24 is extended downwardly to form a portion 35 coaxial with the shaft 24 and pivotally supported in a screw eye 36 secured in the beam 10, whereby the shaft 24 and its integral parts are firmly mounted for swinging movement about a vertical axis.

The spring 13 is adjustably secured to the beam 10 by a pair of clips 37, wherein the spring 13 may be slid vertically to adjust the tension of the hook 33 in its engagement with the pin 34, and also to render the tip-up more compact for purposes of transportation.

A wing nut 38 is provided on the pivot bolt 12a, whereby the swingable supports 11, 12 may be clamped in fixed position relative to the beam 10. Any suitable fish line 39 is mounted on the reel 21a for supporting a fish hook 40 of desired style.

*Operation*

In operation of the tip-up herein disclosed, a suitable hole will first be made in the ice, and the supports 11, 12 properly adjusted in horizontal cross-wise arrangement, as shown in Figs. 1 and 2, in order to support the tip-up in proper position. A sufficient length of the fish line 39 will then be unwound from the reel 21a to support the hook 40 at the desired depth in the water and the hook will then be baited as desired by the fisherman.

The shaft 24 will now be rotated in the tube 25 to bring the alarm catch lever 28 into engagement with the stop lever 29, and the hook 33 of the flag spring 13 will be engaged under the end of the holding pin 34, whereby the signal flag 14 will be held depressed, and the alarm bell 17 will be prevented from operating.

The ring handle 20a of the bell alarm device 15 will now be rotated to wind the spring 20. The tip-up will then be placed in the hole in the ice with the reel 21 and the line 39 connected thereto submerged in the water under the ice and supporting the baited hook 40. Being wholly submerged, ice will not form on the line. It will be thus seen that when a fish strikes the hook, the resulting pull on the line 39 will move the reel pin 22a and rotate the shaft 24, thereby disengaging the catch lever 28 from the stop lever 29, and permitting the bell to ring.

At the same time, the crank 32 will move counterclockwise or to the left in Fig. 4, and push the hook 33 off from the stop pin 34 thereby permitting the flag 14 to swing upwardly into the dotted line position shown in Fig. 1.

It has been found that the combination of the ringing bell and the elevated flag is very effective in attracting the attention of the fisherman, even though he may be some distance away.

One advantage of the present invention is that only a very slight pull on the fish line is required in order to trip the bell and flag signal apparatus.

A further advantage is that the shaft 24 cannot freeze or stiffen up as it is enclosed in the "vaseline" filled tube 25 which extends below the water level.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a tip-up, a beam adapted to be mounted in an upright position, visual signal means mounted upon an upper portion of said beam and resiliently urged into erect display position, means for holding said visual signal means in depressed non-display position, audible signal means mounted upon a central portion of said beam and normally operable to sound an alarm, fish line holding means mounted upon a lower portion of said beam including an arm movable in response to a pull upon the fish line, and a turnable actuating means longitudinally mounted upon said beam, said actuating means including an operative connection with said movable arm, a lever engageable with said audible signal means to obstruct its operation, and also including a crank engageable with said visual signal means to release it from said visual signal holding means.

2. The invention defined in claim 1, wherein said visual signal means includes a flat spring secured at one end to said beam, a hook formed at the free end of said spring, and a flag on said spring, and wherein said visual signal holding means includes a laterally disposed pin having a headless end adapted to be engaged by said hook.

3. The invention as defined in claim 1, wherein said audible signal means includes a bell alarm device and a housing through which pass the beam and actuating means.

4. The invention as defined in claim 1, wherein said fish line-holding means comprises a shaft mounted at one end in said beam, and a reel on said shaft, said movable arm being eccentrically mounted on said reel and extending parallel to the shaft.

JOHN F. BAULSKI.

REFERENCES CITED

The following references are of record in the file of this patent:

UNITED STATES PATENTS

| Number | Name | Date |
|---|---|---|
| 1,847,798 | Wark | Mar. 1, 1932 |
| 2,170,000 | Eggleston | Aug. 22, 1939 |
| 2,198,286 | Krivutza | Apr. 23, 1940 |
| 2,448,346 | Baugh et al. | Aug. 31, 1948 |
| 2,451,693 | Richards | Oct. 19, 1948 |